United States Patent
Ferrari et al.

(10) Patent No.: US 11,832,241 B2
(45) Date of Patent: Nov. 28, 2023

(54) OPERATING MORE THAN ONE WIRELESS COMMUNICATION PROTOCOL WITH A COEXISTENCE WINDOW

(71) Applicant: Sonova AG

(72) Inventors: Federico Ferrari, Bern (CH); Amre El-Hoiydi, Neuchâtel (CH)

(73) Assignee: Sonova AG, Staefa (CH)

( * ) Notice: Subject to any disclaimer, the term of this patent is extended or adjusted under 35 U.S.C. 154(b) by 235 days.

(21) Appl. No.: 17/293,051

(22) PCT Filed: Nov. 14, 2018

(86) PCT No.: PCT/EP2018/081139
§ 371 (c)(1),
(2) Date: May 12, 2021

(87) PCT Pub. No.: WO2020/083513
PCT Pub. Date: Apr. 30, 2020

(65) Prior Publication Data
US 2021/0400688 A1    Dec. 23, 2021

(51) Int. Cl.
*H04W 72/12* (2023.01)
*H04W 72/1263* (2023.01)
*H04L 69/14* (2022.01)

(52) U.S. Cl.
CPC ......... *H04W 72/1263* (2013.01); *H04L 69/14* (2013.01)

(58) Field of Classification Search
CPC ... H04W 72/1263; H04W 4/80; H04W 72/00; H04L 69/14; H04L 29/06; H04L 12/04; H04L 12/5691; H04J 3/06; H04R 25/00
See application file for complete search history.

(56) References Cited

U.S. PATENT DOCUMENTS

| | | | |
|---|---|---|---|
| 9,246,522 B1 * | 1/2016 | Wong | ................ H04W 72/1215 |
| 10,003,896 B2 | 6/2018 | Pedersen et al. | |

(Continued)

FOREIGN PATENT DOCUMENTS

| | | |
|---|---|---|
| CN | 101375619 A | 2/2009 |
| CN | 101682540 A | 3/2010 |

(Continued)

OTHER PUBLICATIONS

European Patent Office, International Searching Authority, International Search Report for PCT/EP2018/081139, dated Jun. 7, 2019, Rijswijk, Netherlands.

*Primary Examiner* — Mewale A Ambaye
(74) *Attorney, Agent, or Firm* — ALG Intellectual Property, LLC

(57) ABSTRACT

The disclosed technology relates to operating two wireless communication protocols during operation of a hearing device. The disclosed technology includes a method that includes: aligning a timing of audio frames of a first wireless communication protocol with a timing of slots of a second wireless communication protocol to reduce overlapping requests to access a shared transceiver from the first wireless communication protocol and the second wireless communication protocol; receiving a first request to access the shared transceiver of the wireless communication device from the first wireless communication protocol and receiving a second request to access the shared transceiver of the wireless communication device from the second wireless communication protocol during a coexistence window; and granting the second request from the second wireless communication protocol to be executed based on priority of the second wireless communication protocol over the first wireless communication protocol during the coexistence window.

24 Claims, 7 Drawing Sheets

(56) References Cited

U.S. PATENT DOCUMENTS

| | | | | |
|---|---|---|---|---|
| 2010/0079356 A1* | 4/2010 | Hoellwarth | ............ | H04B 1/385 |
| | | | | 345/8 |
| 2016/0287166 A1* | 10/2016 | Tran | ......................... | A61B 5/74 |
| 2017/0265025 A1* | 9/2017 | Deck | ....................... | H04W 4/80 |

FOREIGN PATENT DOCUMENTS

| | | | |
|---|---|---|---|
| CN | 101743735 A | 6/2010 | |
| CN | 105763213 A | 7/2016 | |
| EP | 3343782 A1 | 7/2018 | |
| WO | 2018/145756 A1 | 8/2018 | |
| WO | 2018145756 A1 | 8/2018 | |
| WO | WO-2018145756 A1 * | 8/2018 | ........... H04R 25/554 |

\* cited by examiner

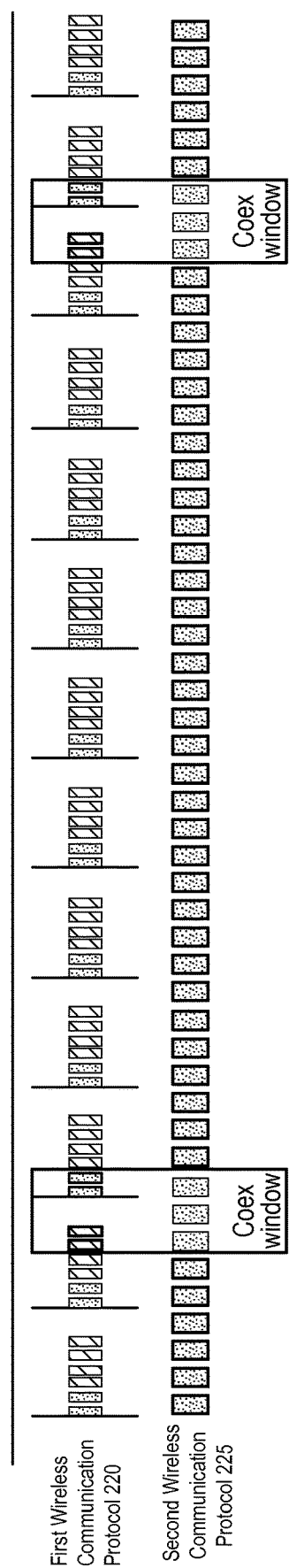

OPERATING MORE THAN ONE WIRELESS COMMUNICATION PROTOCOL WITH A COEXISTENCE WINDOW

TECHNICAL FIELD

The disclosed technology generally relates to wireless communication. More specifically, the disclosed technology relates to the operation of two wireless communication protocols during operation of a hearing device.

BACKGROUND

Hearing devices can execute several wireless communication protocols. For example, hearing devices can use Bluetooth Basic Rate/Enhanced Data Rate™ (Bluetooth BR/EDR™), Bluetooth Low Energy™, a proprietary protocol (e.g., Roger™), or other protocols (e.g., a television streaming protocol). A hearing device may use Bluetooth BR/EDR™ for streaming music or streaming a phone call. Also, a hearing device may use a proprietary protocol to communicate with another hearing device, e.g., to communicate binaurally or bimodally. For example, a first hearing device can transmit audio to a second hearing device during a wind noise canceling operation.

Even though hearing devices can use several wireless communication protocols, hearing devices may experience technical issues when using several protocols, especially if the protocols are used simultaneously, separately, or sporadically on the same device. For example, a hearing device user may hear audio artifacts if the hearing device is binaurally streaming audio from another hearing device and attempting to keep a connection with a smartphone using Bluetooth BR/EDR™ because packets associated with the streaming audio can disrupt the transmission or reception of packets for maintaining the Bluetooth BR/EDR™ connection. Accordingly, a need exists to address at least the above identified problem and provide additional benefits.

U.S. Pat. No. 7,801,099 titled "Cooperative Transceiving Between Wireless Interface Devices of a Host Device with Acknowledge Priority," filed May 10, 2007, discloses a wireless communication device configured to use two different protocols (e.g., Wireless Local Area Networks (WLAN) and Bluetooth™). The patent discloses using two different protocols. Specifically, the patent discloses a first wireless interface device that transmits a first outbound packet in accordance with a first wireless communication protocol at a first power level and a first rate during a first time interval and that transmits a second outbound packet at a second power level and a second rate during a second time interval, wherein the first power level is less than the second power level and wherein the second rate is less than the first rate. A second wireless interface device transceives data between the host module and a second external device during the second time interval in accordance with a second wireless communication protocol.

Although this technology provides one solution for addressing wireless communication problems with two wireless communication protocols, it does not disclose how to address several problems, e.g., how to maintain a connection with an external device and stream audio between hearing devices using two different protocols.

SUMMARY

The disclosed technology includes a method to wirelessly communicate with two wireless communication protocols. The method can be for a wireless communication device that includes a shared transceiver. The method can comprise the following operations: aligning a timing of audio frames of a first wireless communication protocol with a timing of slots of a second wireless communication protocol to reduce overlapping requests to access a shared transceiver from the first wireless communication protocol and the second wireless communication protocol; receiving a first request to access the shared transceiver of the wireless communication device from the first wireless communication protocol and receiving a second request to access the shared transceiver of the wireless communication device from the second wireless communication protocol during a coexistence window, the coexistence window having a duration of less than or equal to a duration of an audio frame of the first wireless communication protocol; and granting the second request from the second wireless communication protocol to be executed based on priority of the second wireless communication protocol over the first wireless communication protocol during the coexistence window. Optionally, the first request and the second request can be received simultaneously.

Optionally, the method further comprises: determining that the wireless communication device is binaurally streaming audio information and/or transmitting the selected second request.

Optionally, the method further comprises receiving a third request to access the shared transceiver of the wireless communication device from the first wireless communication protocol and receiving a fourth request to access the shared transceiver of the wireless communication device from the second wireless communication protocol outside of the coexistence window; and granting the third request from the first wireless communication protocol to be executed based on priority of the first wireless communication protocol over the second wireless communication protocol outside the coexistence window. Optionally, the method can further comprise: transmitting the selected third request. Optionally, the third request and the fourth request can be received simultaneously.

Optionally, the coexistence window can overlap two consecutive audio frames and/or the coexistence window is repeated every 9th audio frame of the first wireless communication protocol.

Optionally, the first wireless communication protocol is a synchronous low-latency audio streaming protocol, wherein low-latency includes end-to-end audio latency of less than 20 milliseconds.

Optionally, the second wireless communication protocol has a maximum slot size that is less than or equal to the duration of the coexistence window. Optionally, the maximum slot size of packets transmitted and/or received for the second wireless protocol are based on the duration of the coexistence window.

Optionally, the first wireless communication protocol is a binaural or bimodal voice streaming protocol for hearing devices.

Optionally, the second wireless communication protocol is Bluetooth Basic Rate/Enhanced Data Rate™.

Optionally, the method further comprises: determining that first wireless communication protocol has been deactivated; and discontinuing the time aligning of the first and second wireless communication protocol.

Optionally, a time duration between two consecutive coexistence windows is less than or equal to 22.5 milliseconds and greater than or equal to 5 milliseconds.

Optionally, the coexistence window is repeated periodically.

Optionally, the coexistence window overlaps with sniff anchor points of the second wireless communication protocol when the second wireless communication protocol operates in sniff mode.

Optionally, the method further comprises: preventing the second wireless communication protocol from transmitting packets even if the first wireless communication protocol does not require access to the shared transceiver outside of a coexistence window.

Optionally, the method further comprises: preventing an exchange of multiple slot packets on the second wireless communication protocol.

Optionally, the slots are associated with master-slave communications for a hearing device, wherein the hearing device is a master device or a slave device.

A computer program can be configured to implement the method. The disclosed technology also includes a wireless communication device (e.g., a hearing device) configured to perform the method. In some implementations, the disclosed technology includes a wireless communication device comprising: a memory storing a first wireless communication protocol and a second wireless communication protocol, the first wireless communication protocol for streaming audio, and the second wireless communication protocol configured to transmit or receive packets in slots; a controller for controlling transmission and reception of packets based on requests from the first wireless communication protocol and the second wireless communication protocol; and a shared transceiver for transmitting or receiving the packets.

The controller can be configured to: align a timing of audio frames of a first wireless communication protocol with a timing of slots of a second wireless communication protocol to reduce overlapping requests to access the shared transceiver from the first wireless communication protocol and the second wireless communication protocol; receive a first request to access the shared transceiver of the wireless communication device from the first wireless communication protocol and receiving a second request to access the shared transceiver of the wireless communication device from the second wireless communication protocol during a coexistence window, the coexistence window having a duration of less than or equal to a duration of an audio frame of the first wireless communication protocol; and grant the second request from the second wireless communication protocol to be executed based on priority of the second wireless communication protocol over the first wireless communication protocol during the coexistence window.

Optionally, the memory further comprises instructions for performing phone call streaming for the wireless communication device.

BRIEF DESCRIPTION OF FIGURES

FIG. 6 illustrates a schematic overview diagram of the first wireless communication protocol and the second wireless communication protocol with a repeated coexistence window in accordance with some implementations of the disclosed technology.

Figure 1:
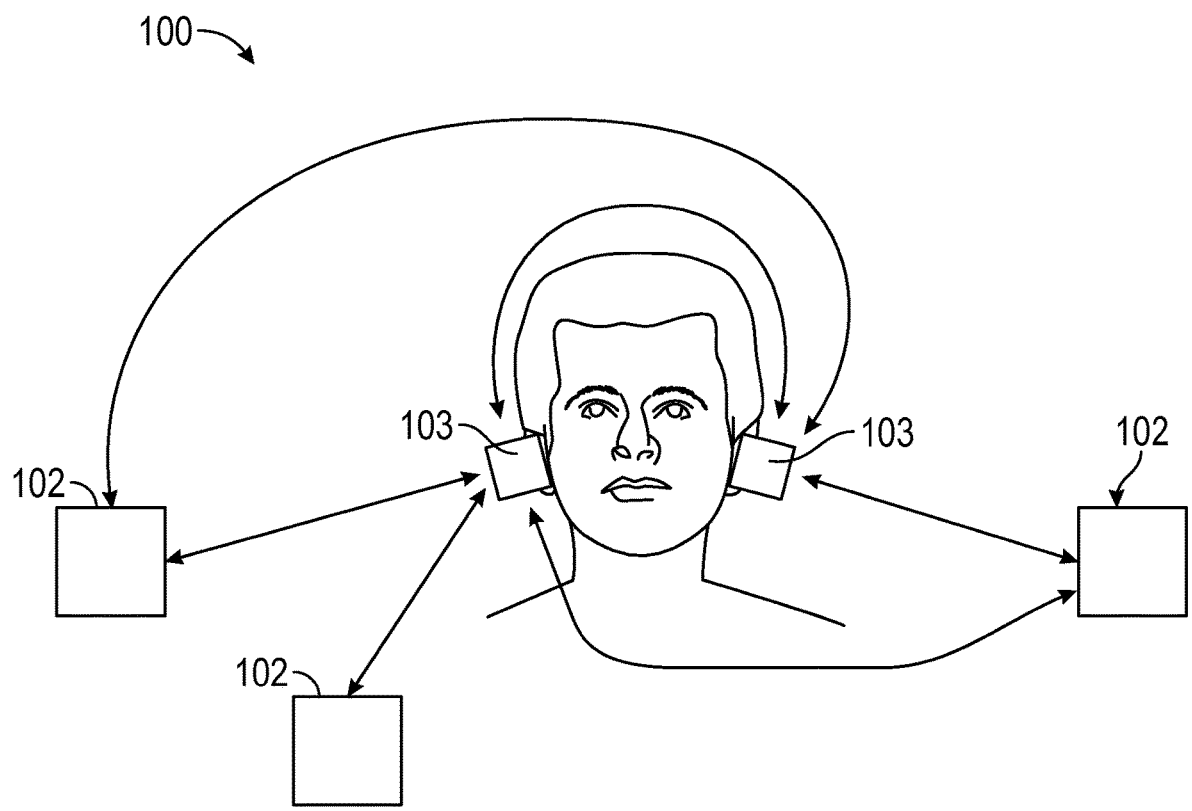
FIG. 1 illustrates a communication environment in accordance with some implementations of the disclosed technology.

The drawings are not to scale. Some components or operations may be separated into different blocks or combined into a single block for the purposes of discussion of some of the disclosed technology. Moreover, while the technology is amenable to various modifications and alternative forms, specific implementations have been shown by way of example in the drawings and are described in detail below. The intention, however, is not to limit the technology to the selected implementations described. On the contrary, the technology is intended to cover all modifications, equivalents, and alternatives falling within the scope of the technology as defined by the appended claims.

DETAILED DESCRIPTION

The disclosed technology relates to operation of two wireless communication protocols for a wireless communication device. A hearing device is a wireless communication device that provides audio signals and accordingly it can implement the disclosed technology.

The disclosed technology includes a method for a wireless communication device that includes a shared transceiver, the method comprises: aligning a timing of audio frames of a first wireless communication protocol (e.g., binaural streaming) with a timing of slots of a second wireless communication protocol (e.g., Bluetooth BR/EDR™) to reduce overlapping requests to access the shared transceiver from the first wireless communication protocol and the second wireless communication protocol. The method can include receiving a first request to access the shared transceiver of the wireless communication device from the first wireless communication protocol and receiving a second request to access the shared transceiver of the wireless communication device from the second wireless communication protocol during a coexistence window. The method can further include granting the second request from the second wireless communication protocol to be executed based on priority of the second wireless communication protocol over the first wireless communication protocol during the coexistence window. Similarly, the disclosed technology includes a computer program configured to implement the method and a wireless communication device (e.g., a hearing device) configured to perform the method. Optionally, the first request and the second request are received simultaneously.

The coexistence window can have a duration of less than or equal to a duration of an audio frame of the first wireless communication protocol. The coexistence window can overlap two consecutive audio frames and/or the coexistence window can be repeated every 9th audio frame of the first wireless communication protocol. The method can also include handling requests outside of the coexistence window as described in more detail in FIGS. 2, 3A-3C, 4, and 5.

The disclosed technology solves at least the technical problem of reducing overlapping requests or handling simultaneous requests to access a shared transceiver of a wireless communication device. Reducing overlapping requests reduces audio artifacts in wireless communication for a hearing device and provides additional technical benefits. For example, the disclosed technology enables two wireless protocols to function simultaneously while reducing the impact on audio quality in an audio stream. Another advantage is that the disclosed technology enables two wireless protocols to operate simultaneously with a performance similar to when they operate separately (e.g., delay is minimized).

FIG. 1 illustrates a communication environment 100. The communication environment 100 includes wireless communication devices 102 and hearing devices 103. As shown by double-headed bold arrows in FIG. 1, the wireless communication devices 102 and the hearing devices 103 can communicate wirelessly, e.g., each wireless communication device 102 can communicate with each hearing device and each hearing device can communicate with the other hearing device. Wireless communication can include using a protocol such as Bluetooth BR/EDR™, Bluetooth Low Energy™, a proprietary communication (e.g., binaural communication protocol between hearing aids or bimodal communication protocol between a hearing aid and hearing device), ZigBee™, Wi-Fi™, or an Industry of Electrical and Electronic Engineers (IEEE) wireless communication standard.

A hearing device user can wear the hearing devices 103 and the hearing devices 103 can be streaming audio between the devices. Streaming audio between the devices can include wind noise canceling operations or hearing device audio streaming programs (e.g., hearing aids that exchange audio information to enable hearing or improve hearing). For example, while simultaneously streaming audio information between the hearing devices 103, each hearing device 103 can exchange data with a mobile device or a fitting station. A fitting station is a computing device used by a doctor or professional to fit a hearing device. As another example, the hearing device 103 can be streaming audio from another hearing device 103 and simultaneously maintaining a connection with a mobile device (e.g., to stream a phone call if the mobile device receives it or stream music if the mobile device requests to stream music the hearing device).

To operate the two wireless communication protocols simultaneously, the hearing devices 103 (or a single hearing device 103 or a single wireless communication 102) can modify the two wireless communication protocols to adjust frame timing, slot timing, and priority of requests from the different wireless communication protocols during a specific period (e.g., during a coexistence window as described in more detail in FIGS. 2, 3A-3C, 4, and 5). For example, the hearing device 103 can stream audio information from another hearing device 103 using a binaural streaming protocol while simultaneously communicating with a mobile phone device using Bluetooth BR/EDR™, where the timing of the binaural streaming protocol and Bluetooth BR/EDR™ have been modified and the priority of requests from these protocols is different during and outside of a coexistence window.

The wireless communication devices 102 are computing devices that are configured to wirelessly communicate. Wireless communication includes wirelessly transmitting information, wirelessly receiving information, or both. The wireless communication devices 102 shown in FIG. 1 include computers (e.g., desktop or laptop), televisions (TVs) or components in communication with television (e.g., TV streamer), a car audio system or circuitry within the car, a mobile device (e.g., smartphone), tablet, remote control, an accessory electronic device, a wireless speaker, or watch. It should be noted that the hearing device 103 is also a wireless communication device 102, but the hearing device 103 is configured to provide audio to a user in addition to wirelessly communicating with other devices.

Some example hearing devices include hearing aids, headphones, earphones, assistive listening devices, or any combination thereof; and hearing devices include both prescription devices and non-prescription devices configured to be worn on or near a human head. As an example of a hearing device, a hearing aid is a device that provides amplification, attenuation, or frequency modification of audio signals to compensate for hearing loss or difficulty; some example hearing aids include a Behind-the-Ear (BTE), Receiver-in-the-Canal (RIC), In-the-Ear (ITE), Completely-in-the-Canal (CIC), Invisible-in-the-Canal (IIC) hearing aids or a cochlear implant (where a cochlear implant includes a device part and an implant part).

The hearing devices 103 are configured to binaurally communicate or bimodally communicate. The binaural communication can include a hearing device 103 transmitting information to or receiving information from another hearing device 103. Information can include volume control, signal processing information (e.g., noise reduction, wind canceling, directionality such as beam forming information), or compression information to modify sound fidelity or resolution. Binaural communication can be bidirectional (e.g., between hearing devices) or unidirectional (e.g., one hearing device receiving or streaming information from another hearing device). Bimodal communication is like binaural communication, but bimodal communication includes a cochlear device communicating with a hearing aid.

Figure 2:
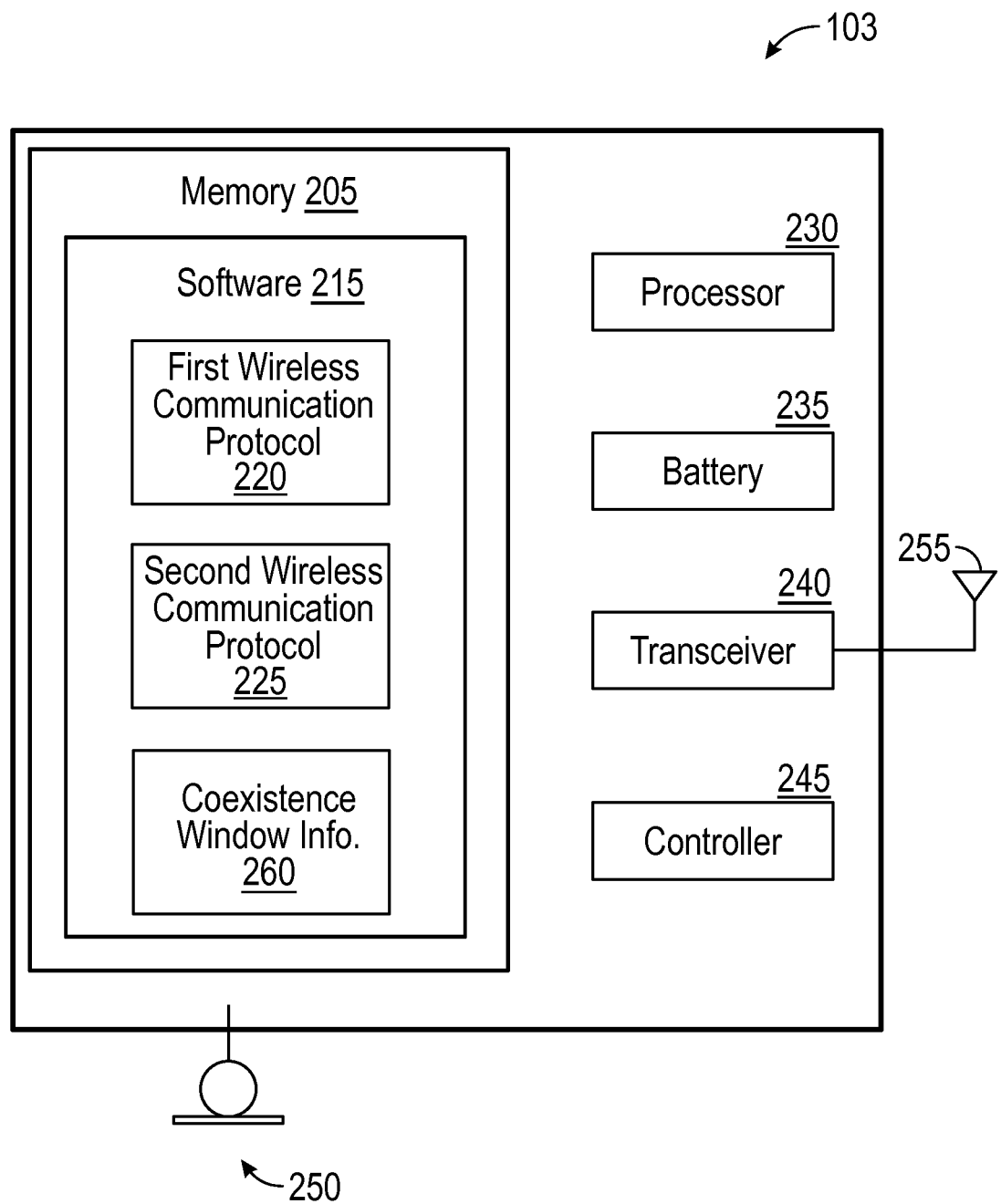
FIG. 2 illustrates a hearing device from FIG. 1 in more detail in accordance with some implementations of the disclosed technology.

FIG. 2 is a block diagram illustrating the hearing device 103 from FIG. 1 in more detail. FIG. 2 illustrates the hearing device 103 with a memory 205, software 215 stored in the memory 205, the software 215 includes a first wireless communication protocol 220 and a second wireless communication protocol 225, and coexistence window information (info.) 260. The first and second wireless communication protocols are a system of rules that allow two or more devices to wirelessly communicate information. The hearing device 103 also includes a processor 230, a battery 235, a transceiver 240, a controller 245, a microphone 250, and an antenna 255. Although FIG. 2 shows the hearing device 103 with components for processing or providing sound, the device in FIG. 2 can also be a wireless communication device 102 (e.g., by removing components such as a microphone or adding components such as a global positioning system chip or software stack (GPS)).

The memory 205 stores instructions for executing the software 215 comprised of one or more modules and data utilized by the modules. The modules perform certain methods or functions for the hearing device 103 and can include components, subcomponents, or other logical entities that assist with or enable the performance of these methods or functions. For example, the modules can store algorithms for carrying out a wireless communication protocol that includes transmitting and receiving information. Although a single memory 205 is shown in FIG. 2, the hearing device 103 can have multiple memories 205 that are partitioned or separated, where each memory can store different information.

The first wireless communication protocol 220 can be a synchronous protocol configured to stream audio. Synchronous generally means that data is sent in a continuous stream at a constant rate, which also generally means clock synchronization in transmitting and receiving wireless communication devices (e.g., master and slave synchronization for wireless communication). The first wireless communication protocol 220 can operate in the unlicensed radio band (e.g., Industrial, Scientific, and Medical (ISM) band) using a frequency of 2.4 GHz. Other frequencies are also possible (e.g., 10 MHz or 5 GHz or 2.4 to 2.4835 GHz).

Examples of the first wireless communication protocol include a binaural voice streaming protocol configured for low-latency audio streaming between hearing devices. Low latency generally means less than 20 milliseconds end-to-end audio latency (e.g., less than 10 milliseconds). The binaural voice streaming protocol (BVST) can be configured to provide audio to each hearing device during a wind noise operation in a hearing program that streams sound from one hearing device to another hearing device worn by the same user.

The second wireless communication protocol 225 can be a wireless communication protocol configured for communication with any wireless communication device. The second wireless communication protocol 225 can operate in the unlicensed radio band (e.g., ISM band) using a frequency of 2.4 GHz. Other frequencies are also possible (e.g., 10 MHz, 5 GHz, or 2.4 to 2.4835 GHz).

The second wireless communication protocol 225 can be configured to enable the hearing device 103 to be master device or slave device and maintain a connection with another wireless communication device. For example, the hearing device 103 can be a master device maintaining its connection with a mobile device, which is a slave device. Alternatively, the mobile device can be the master device and the hearing device 103 can be the slave device. The second wireless communication protocol 225 can enable the hearing device to receive a request to stream music from an external device or to receive a request to stream a telephone call from an external device. The second wireless communication protocol 225 can be Bluetooth BR/EDR™ or another protocol for communicating with mobile devices.

The coexistence window info. 260 includes information related to timing of the first and second wireless communication protocols as well as information regarding the coexistence window. The coexistence window is a duration of time. In some implementations, during the duration of the coexistence window each wireless communication protocol has priority. In some implementations, the coexistence window has a duration of less than or equal to a duration of an audio frame of the first wireless communication protocol.

The coexistence window information 260 can include priority information and time aligning information. Priority information can include information that the controller 245 can use to determine whether a request from the first or second wireless communication protocol has a higher priority. If the first wireless communication protocol is a binaural streaming protocol for hearing devices and the second wireless communication protocol includes maintaining a master-slave connection, the coexistence window information 260 can store information that the second wireless communication protocol has a higher priority than the first wireless communication protocol during a coexistence window and lower priority outside of a coexistence window. The controller 245 can use this priority information to process simultaneous requests from the first and the second wireless communication protocol because it will select the higher priority request based on priority of the protocols.

Time aligning information can include the start and end of audio frames in a wireless communication protocol, the start and end of slots and packets within those slots for master-slave communication, the start and end of packets transmitted in an audio frame, and built in delays associated with the different protocols. The coexistence window information 260 can also include the length of the coexistence window, how often it is repeated, and its location or time duration. The coexistence window information is described in more detail in FIGS. 3A-3C and 5.

The processor 230 can include special-purpose hardware such as application specific integrated circuits (ASICs), programmable logic devices (PLDs), field-programmable gate arrays (FPGAs), programmable circuitry (e.g., one or more microprocessors microcontrollers), Digital Signal Processor (DSP), appropriately programmed with software and/or computer code, or a combination of special purpose hardware and programmable circuitry.

Also, although the processor 230 is shown as a separate unit in FIG. 2, the processor 230 can be on a single chip with the transceiver 240, the controller 245, and the memory 205. The processor 230 can also include a DSP configured to modify audio signals based on hearing loss or hearing programs stored in the memory 205. In some implementations, the hearing device 103 can have multiple processors, where the multiple processors can be physically coupled to the hearing device 103 and configured to communicate with each other.

The battery 235 can be a rechargeable battery (e.g., lithium ion battery) or a non-rechargeable battery (e.g., Zinc-Air) and the battery 235 can provide electrical power to the hearing device 103 or its components.

The microphone 250 is configured to capture sound and provide an audio signal of the captured sound to the processor 230. The processor 230 can modify the sound (e.g., in a DSP) and provide the modified sound to a user of the hearing device 103. Although a single microphone 250 is shown in FIG. 2, the hearing device 103 can have more than one microphone. For example, the hearing device 103 can have an inner microphone, which is positioned near or in an ear canal, and an outer microphone, which is positioned on the outside of an ear. As another example, the hearing device 103 can have two microphones, and the hearing device 103 can use both microphones to perform beam forming operations. In such an example, the processor 230 would include a DSP configured to perform beam forming operations.

The controller 245 controls transmission or reception of packets based on requests from the first wireless communication protocol 220, the second wireless communication protocol 225, or other requests from the hearing device 103 (e.g., from the processor 230). The controller 245 can be implemented in hardware (e.g., part of the processor 230 or be a separate unit), software (e.g., part of software 215), or a combination of software and hardware. The controller 245 can be configured to communicate with the transceiver 240 to transmit or receive packets.

The controller 245 can also be configured to enable the first and second wireless communication protocols to operate simultaneously with reduced overlapping requests for the transceiver 240. In some implementations, the controller 245 is configured to: align a timing of audio frames of a first wireless communication protocol with a timing of slots of a second wireless communication protocol; receive a first request to access the transceiver 240 from the first wireless communication protocol and receive a second request to access the transceiver during a coexistence window; and grant the second request to be executed based on priority of the second wireless communication protocol over the first wireless communication protocol during the coexistence window. The controller 245 can also handle requests outside of the coexistence window such that priority is flipped, e.g., request from the first wireless communication protocol have a higher priority than request from the second wireless communication protocol outside the coexistence window. The controller 245 communicates with the transceiver 240. The transceiver 240 communicates with the antenna 255 to transmit or receive information.

As an example, when the first wireless communication protocol 220 wants to access or use the antenna 255 to transmit or receive a packet, it can request access to the transceiver 240 via the controller 245. If the controller 245 determines that the protocol can have access to the transceiver 240, it will allow the request; if determines that the protocol cannot have access, it will deny the request or ask it to wait.

As showing in FIG. 2, the hearing device 103 has a single or shared transceiver 240. This generally means that the first and second wireless communication protocols share "the shared transceiver 240" to transmit or receive packets. This can also be referred to as a "common" transceiver 240. However, the disclosed technology can be modified to work with a wireless communication device 102 that has more than 1 transceiver (e.g., 2) or more than 1 antenna. In such implementations with more than 1 transceiver or more than 1 antenna, the disclosed technology would reduce the collision of packets if both the first and second wireless communication request to transmit or receive packets using separate or different transceivers or antennas.

The antenna 255 is configured to operation in unlicensed bands such as Industrial, Scientific, and Medical Band (ISM)) using a frequency of 2.4 GHz. The antenna 255 can also be configured to operation in other frequency bands such as 5 GHz, 5 MHz, 10 MHz, or other unlicensed bands.

Although not shown in FIG. 2, the hearing device can also include a transducer to output audio signals (e.g., a loudspeaker or a transducer for a cochlear device configured to convert audio signals into nerve stimulation or electrical signals).

Figure 3A:
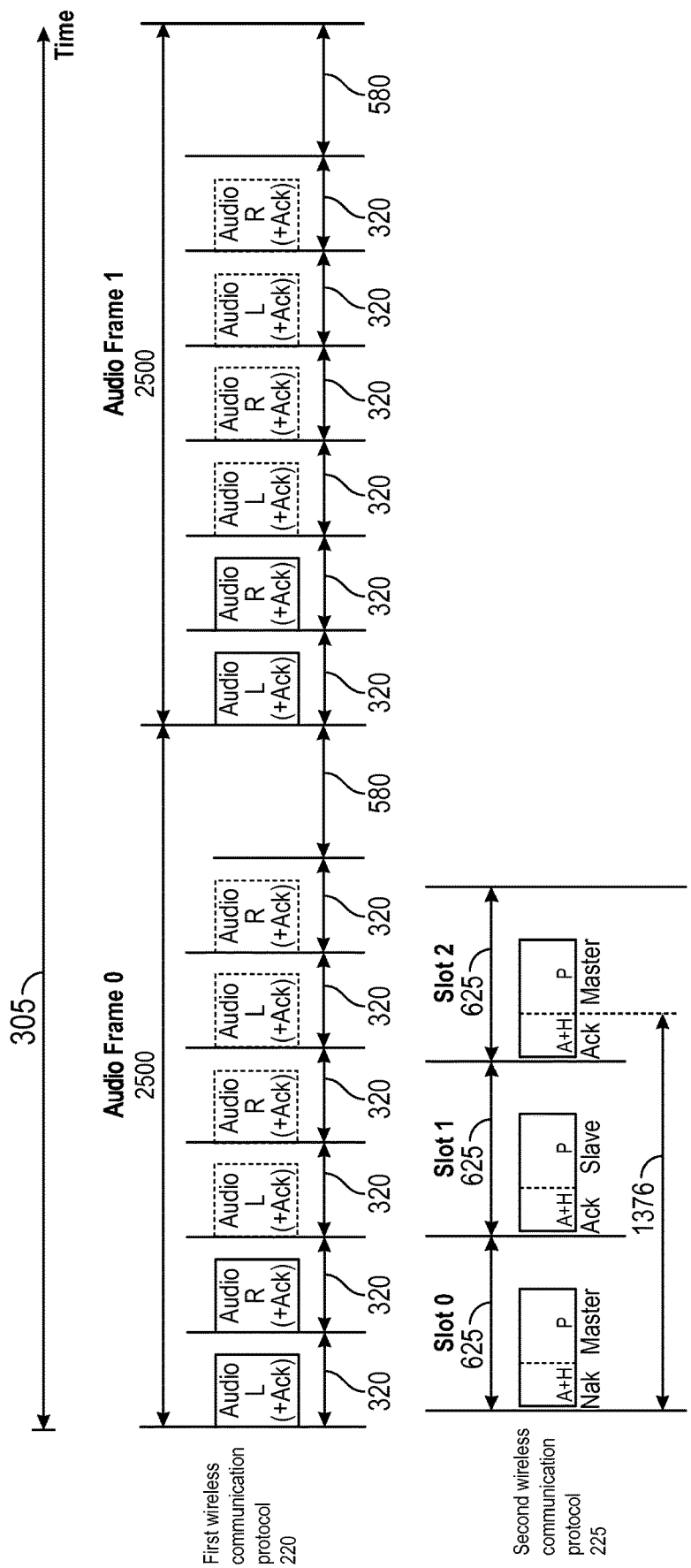
FIG. 3A illustrates a schematic diagram of a first wireless communication protocol and a second wireless communication protocol prior to modification in accordance with some implementations of the disclosed technology.

FIG. 3A illustrates a schematic diagram of the first wireless communication protocol 220 and the second wireless communication protocol 225 prior to modification by the controller 245. The top of FIG. 3 includes a timeline 305 for chronological reference. Below the timeline 305, the first wireless communication protocol 220 has audio frames (e.g., "Audio Frame 0", "Audio Frame 1") lasting 2500 microseconds and audio packets for the left and right audio information (e.g., "Audio L (+Ack)" for a left side hearing device and "Audio R (+Ack)" for a right-side hearing device). Audio frames refer to a frame for the first wireless communication protocol 220 for transmitting or receiving audio information and acknowledgment of the audio information. Although the audio frames in FIG. 3A last for 2500 microseconds, the frames can be shorter (e.g., 1500 microseconds) or longer (e.g., 5000 microseconds); the increasing or decreasing of the audio frames depends on desired properties of the first wireless communication protocol 220.

The first wireless communication protocol 220 enables a low-latency audio stream. For example, the first wireless communication protocol 220 can be an isochronous protocol implementing a Time Division Multiple Access (TDMA) scheme with a short interval of a few milliseconds. It is typical for low-latency audio protocols to use a significant amount of bandwidth (e.g., more than 40% of available bandwidth) to ensure sufficient audio quality in situations of poor wireless connectivity (e.g., wireless connectivity below a threshold bandwidth or latency such that a minimum quality of service is not possible). For example, the first wireless communication protocol 220 can be a BVST for a hearing device.

Below the first wireless communication protocol 220 in FIG. 3, the second wireless communication protocol 225 is shown. The second wireless communication protocol 225 can be Bluetooth BD/EDR™ or another protocol for master-slave communications. An idle second wireless communication protocol 225 connection can consist of an exchange of empty or short packets between master and slave device. Every packet can contain an access code (used for identifying a specific piconet) (shown as "A" in FIG. 3A), a header (used for automatic repeat request and flow control) (shown as "H" in FIG. 3A), and an optional payload (shown as "P" in FIG. 3A). The purpose of these packets is to maintain the slave correctly aligned to the master, to exchange information on the low-level link via the Link Manager Protocol (e.g., channel quality report and channel selection for adaptive frequency hopping), and to update the state of active profiles (e.g., notify an incoming phone call in Hands Free Profile (HFP) or beginning of an audio stream in Advanced Audio Distribution Profile (A2DP)). The communications between the master and the slave devices can be referred to as "master-slave" communications, where the communications refer to packets of information or empty slots reserved for master-slave communications.

The exchange of packets between a master and slave occurs during master and slave slots. In some implementations, the master-slave slots alternate every 625 microseconds (as shown in FIG. 3A), but this timing can be different depending on the protocol. If the connection between the master and slave is active, the slave normally attempts to receive a packet from the master on every master slot, although the master can skip transmissions on master slots up to an extent. If the connection is in a low-power mode (e.g. sniff mode), communication can occur only in corresponding dedicated anchor points that repeat periodically. More specifically, the second wireless communication protocol 225 can have a sniff mode where the device is less active and thus saves power compared to a regular mode (e.g., Bluetooth BR/EDR™ sniff mode). In such sniff modes, the wireless communication device can "sleep" and only listen for transmissions at a set interval (e.g., every 100 milliseconds). During sniff mode, the second wireless communication protocol 225 can modify its parameters to save power.

The slave can transmit a packet in a slave slot only if it correctly received at least the access code and the header of a master packet in the previous slot. A device acknowledges the reception of a valid packet with data from another device by setting an automatic repeat request number (ARQN) bit in the header of the next transmitted packet; if the transmitter does not receive an acknowledgment (Ack), it retransmits the same packet in the next allowed slot.

In some implementations, the second wireless communication protocol 225 can allow the exchange of up to 1-slot, 3-slot, or 5-slot packets. The maximum slot size of packets can be configured at runtime and separately for each direction. As shown in FIG. 3A, the time required to successfully exchange of a packet from the slave depends on the maximum slot size used in both directions. For example, if Bluetooth ED/EDR™ is the second wireless communication protocol, a successful exchange of a packet from the slave requires at least 1376 microseconds, assuming that both master and slave transmit a 1-slot packet: 625 microseconds for the first master slot, 625 microseconds for the second slave slot, 126 microseconds for the master's access address and header containing the acknowledgment. A successful exchange of a 3-slot packet from the slave requires 2626 microseconds if the master transmits a 1-slot packet but 3876 microseconds if the master transmits a 3-slot packet.

For Bluetooth ED/EDR™, the worst-case scenario required for a successful exchange of a packet from the slave is D=((MS+SS)*625+126) microseconds, where MS is the maximum slot size of packets that can be transmitted by the master and SS is the maximum slot size of packets that can be transmitted by the slave (e.g., valid values for MS and SS are 1, 3, or 5).

As shown in FIG. 3A, the timings of a Bluetooth BR/EDR connection and those of the low-latency audio protocol are in general uncorrelated and their mutual alignment may change over time. In situations of unfavorable alignment, even the exchange of a single-slot packet may collide with an entire audio frame and cause audio artefacts.

Figure 3B:
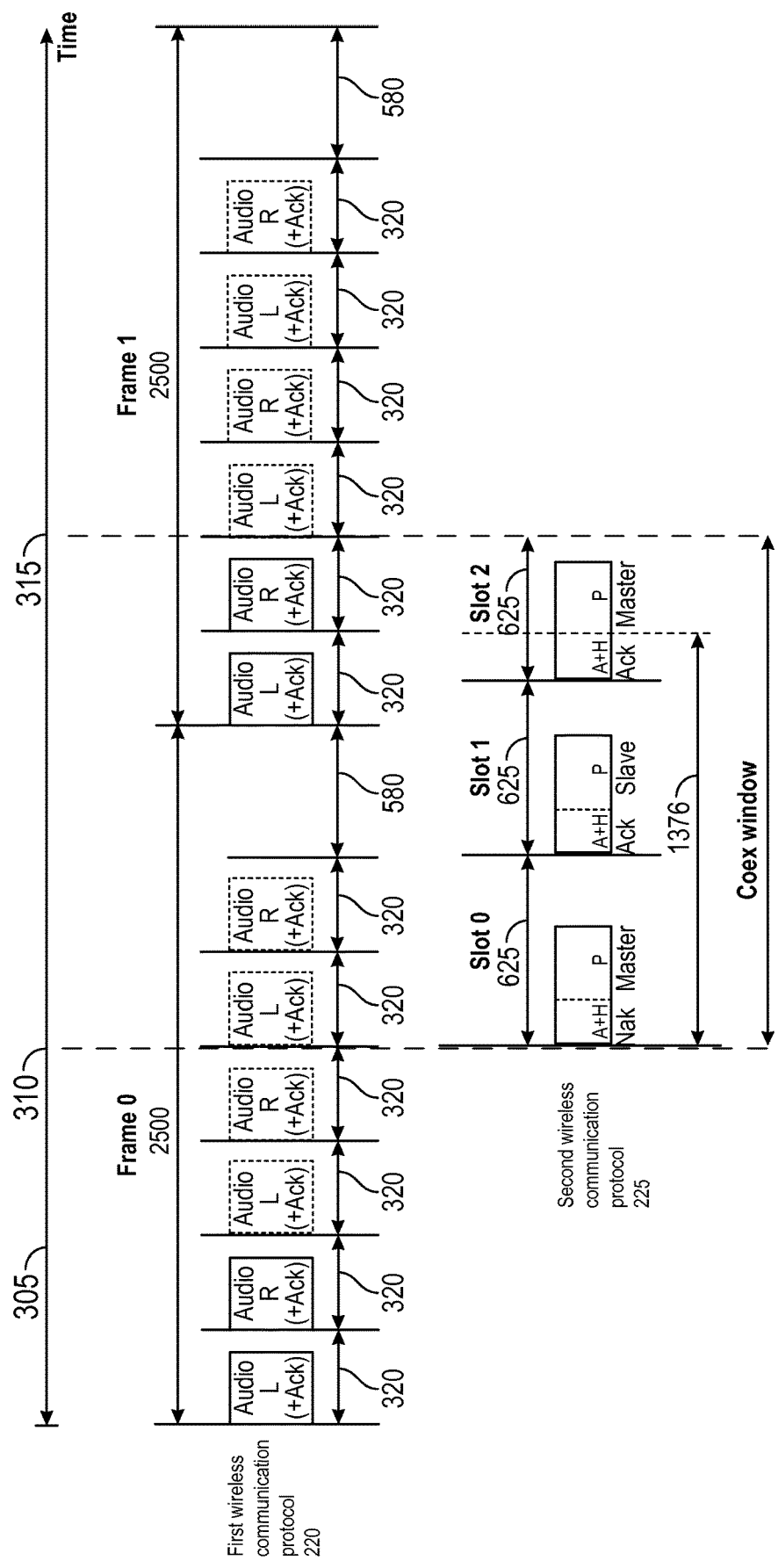
FIG. 3B illustrates a schematic diagram of the first wireless communication protocol and the second wireless communication protocol after modification in accordance with some implementations of the disclosed technology.

FIG. 3B illustrates a schematic diagram of the first wireless communication protocol and the second wireless communication protocol after modification. FIG. 3B shows in the first wireless communication protocol 220 on top of the second wireless communication protocol 225. In contrast to FIG. 3A, FIG. 3B illustrates that includes a coexistence window, which is shown by the dashed lines and the double headed bold arrow. During the coexistence window, the second wireless communication protocol has priority. Also, as shown in FIG. 3B, the coexistence window spans two consecutive audio frames (Frame 0 and Frame 1). The second wireless communication protocol 225 has its slots time aligned with the audio frames of the first wireless communication protocol such that the first slot of the second wireless communication protocol occurs at the same time as the last two available retransmissions as the audio packets in frame 0 of the first wireless communication protocol and the last slot occurs during the first audio packets of the next audio frame (frame 1) of the first wireless communication protocol. This is shown with time mark 310 and time mark 315 on the timeline 305 in FIG. 3B. The advantage of this time aligning is that it reduces overlapping requests to access a shared transceiver (e.g., the first and second wireless protocols will send less simultaneous requests to the transceiver in this time alignment compared to without time alignment). Here, the coexistence window enables the transceiver 240 to choose the packets in slot 0, slot 1, or slot 2 over the retransmitted audio packets in frame 0 or the first transmitted slots in frame 1 for the first wireless communication protocol. The advantages of this time alignment and coexistence window position and duration are further explained in FIG. 5 and FIG. 6.

Although sniff mode is not shown in FIG. 3B, the second wireless communication protocol 225 can operate in a sniff mode (e.g., low power). In the sniff mode, the wireless communication device can set the coexistence window to overlap with sniff anchor points of the second wireless communication protocol (225) when the second wireless communication protocol (225) operates in sniff mode.

Figure 4:
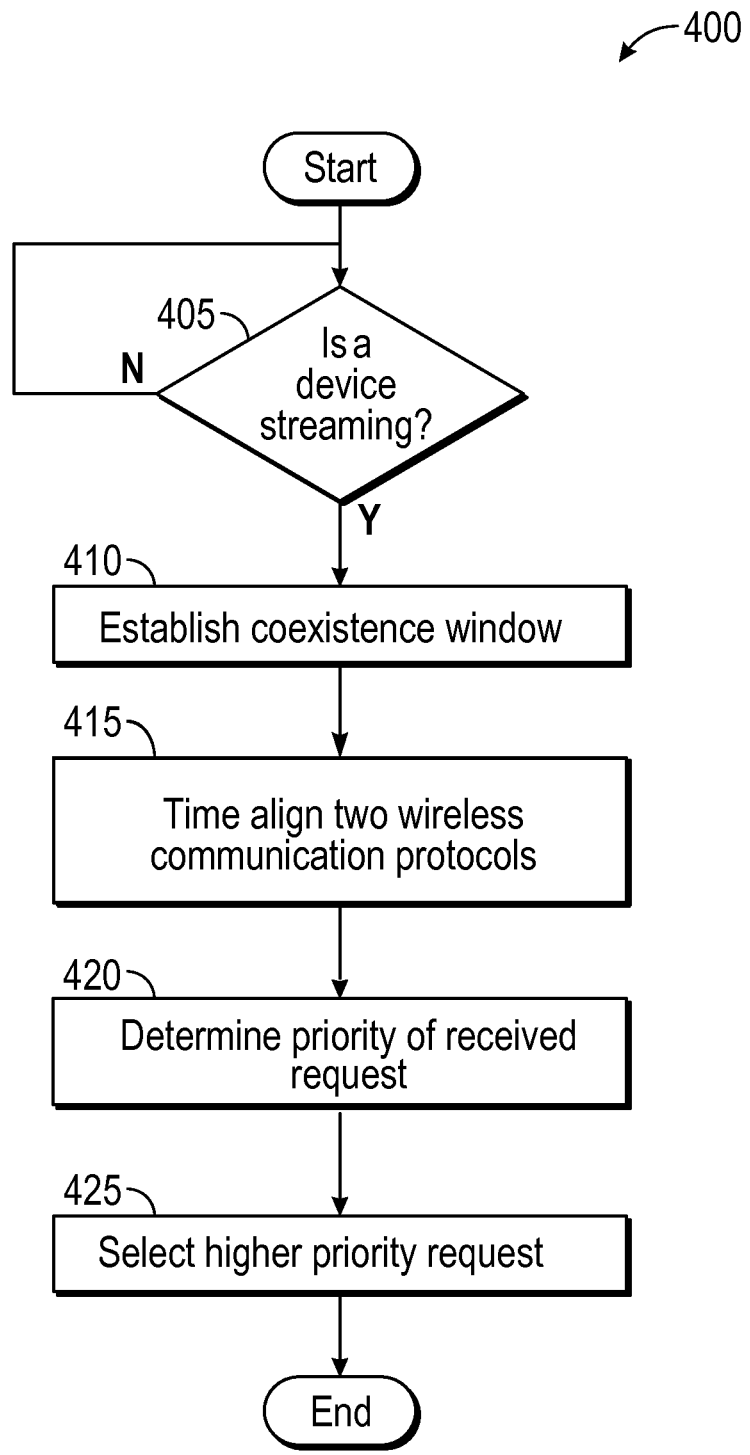
FIG. 4 illustrates a block flow diagram for a hearing device enabling two wireless communication protocols in accordance with some implementations of the disclosed technology.

FIG. 4 illustrates a block flow diagram for a process 400 for using two protocols for a wireless communication device (e.g., a single hearing device 103 from FIG. 1 and FIG. 2 can carry out the process 400). In some implementations, part of the process may be carried out on more than one device (e.g., two hearing devices perform the process or a hearing device and mobile perform the process 400). The process 400 begins with decision operation 405 and continues with operation 410. The process 400 can also be referred to as an algorithm for executing two wireless communication protocols.

At streaming decision operation 405, the hearing device determines whether it is streaming. Specifically, the hearing device determines that it is performing or will shortly perform (e.g., within 3 seconds) a streaming operation. The streaming operation can be related to exchange audio information between a hearing device as part of a first wireless communication protocol (e.g., BVST). The hearing device can determine that it is streaming based on a user request such as a user requesting that hearing device enter a wind noise cancelation operation, which can require streaming of sound from one hearing device to another. The hearing device can also determine it is streaming based on a setting of the hearing device (e.g., a flag that indicates it is streaming or has activated a BVST).

The streaming operation can include streaming audio from one hearing device to another hearing device including unidirectional streaming or bidirectional streaming. For example, a left hearing device can stream audio from a right hearing device or a right hearing device can stream audio from a second hearing device. The streaming can include the repetition of audio packets and an acknowledgement of reception as disclosed in FIGS. 3A and 3B. For example, a left hearing device can transmit one packet of audio and wait for an acknowledge of receipt and a right hearing device can transmit a packet of audio and wait for an acknowledgement, and this process can be repeated 2, 3, 4, or more times depending on desired error rate and available resources of hearing device. If the hearing device determines that it is streaming audio, it will continue to next operation 410. If the hearing device determines that it will not stream audio, it can remain at the streaming decision operation 405 (e.g., wait for a request to stream audio).

At align operation 415, the hearing device time aligns two wireless communication protocols. The hearing device can time align the first wireless communication protocol with the second wireless communication protocol to reduce overlapping packet traffic and/or reduce overlapping requests to access a shared transceiver. Specifically, the hearing device can align a timing of audio frames of a first wireless communication protocol 220 with a timing of slots of a second wireless communication protocol 225 to reduce overlapping requests to access the shared transceiver from the first wireless communication protocol 220 and the second wireless communication protocol 225. For example, the hearing device can time align the first and second wireless communication protocols as shown in FIG. 3B. More specifically, the first wireless communication protocol 220 has its audio frames time aligned with slots of the second wireless communication protocol 225 such that, within a coexistence window, the first slot of the second wireless communication protocol occurs during available retransmissions of audio packets in frame 0 and the last slot occurs during the first audio packets of the next audio frame (frame 1).

At determine priority operation 420, the hearing device determines the priority of requests. For example, the first wireless communication protocol can request to access a transceiver of the hearing device to transmit audio information in an audio frame related to streaming operation and the second wireless communication protocol may also request access to the transceiver of the hearing device (e.g., simultaneously or close in time). Because the transceiver can only execute one request at a time, the hearing device needs to decide which request will be granted and which will be denied or ignored. If the hearing device is in the coexistence window, it will select the request from the second wireless communication protocol. If the hearing device is outside of the coexistence window, it will select request from the first wireless communication protocol. The priority is based on the priority information, which can be decided by a controller (e.g., controller 245), the first wireless communication protocol having a built in priority and coexistence window, or the second wireless communication protocol having a built in priority and a coexistence window.

For example, when a binaural streaming protocol and a Bluetooth BD/EDR™ protocol request to access the transceiver for the hearing device, the hearing device can allow the Bluetooth BD/EDR™ protocol to access the transceiver over the binaural streaming protocol during the coexistence window. Having the Bluetooth BD/EDR™ favored enables the hearing device to keep its master-slave connection while binaurally streaming audio.

At select higher priority request operation 425, the hearing device selects the higher priority requests based on the operation 420. The hearing device can then transmit the request, e.g., the transceiver can transmit or receive a packet in a master-slave slot.

After the select operation 425, the process 400 can be repeated entirely, repeated partially (e.g., repeat only operation 415), or stop. For example, if it is determined that the hearing device is no longer streaming audio, the hearing device can discontinue the time aligning of the timing of audio frames of the first wireless communication protocol and the second wireless communication window. It can also stop tracking or using the coexistence window (e.g., turn that function off).

Aspects and implementations of the process 400 of the disclosure have been disclosed in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware such with a wireless communication device or a hearing device.

Figure 5:
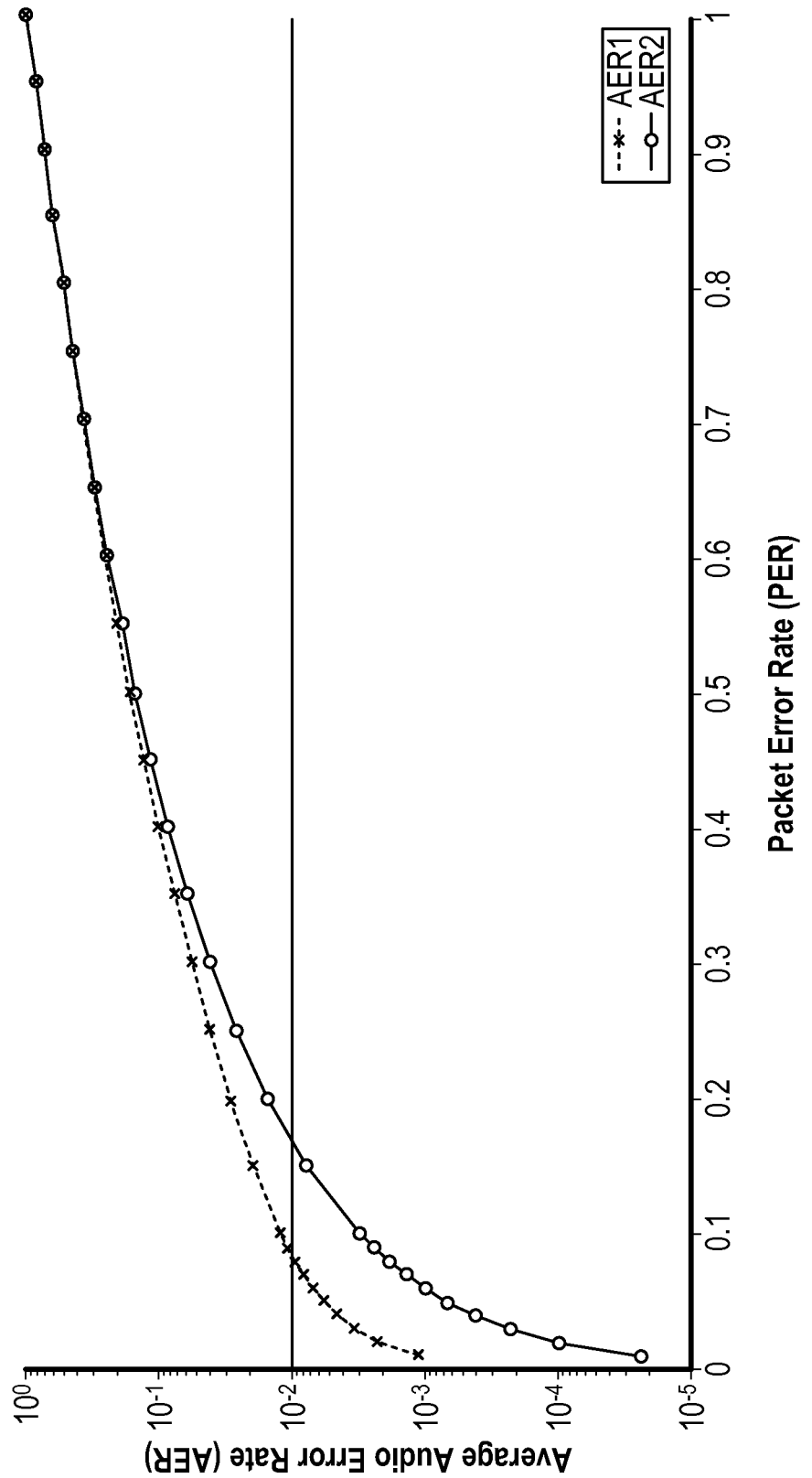
FIG. 5 is an example graph that illustrates that a coexistence window spanning two consecutive audio frames has a lower error rate than a coexistence window spanning a single audio frame.

FIG. 5 is an example graph illustrating a result that a coexistence window spanning two consecutive audio frames of the first wireless communication protocol has a lower error rate than a coexistence window spanning a single audio frame of the first wireless communication protocol.

Regarding the axes for FIG. 5, on the x-axis is packet error rate (PER). PER is used to test the performance of a device receiving packets (also referred to as the "receiver") and is a ratio of a number packets not successfully received by the receiver to a number packets transmitted to the receiver. Not successfully received by the receiver generally means received corrupted packets or not receiving the packets at all. PER is greater than or equal to zero and less than or equal to one. The PER is generally a metric of how well a connection performs. Here, the receiver can be the hearing device 103 or the wireless communication device 102 (FIG. 1).

On the y-axis is audio error rate (AER). The AER is a ratio between the number of audio frames not successfully received by a receiver and the number of audio frames transmitted to that receiver. The AER is greater than or equal to zero and less than or equal to one. AER is generally a metric of how well audio is received. In the context of audio streaming protocols, where a packet carrying an audio frame is transmitted or retransmitted up to N times, a single successful packet reception (out of up to N) is sufficient to receive that audio frame, hence in general AER is less than or equal to PER. Assuming that the outcome of every packet reception attempt is independent from the outcome of previous attempts: $AER=PER^N$, which generally means the higher the PER the higher the AER.

The graph illustrates AER1 for a coexistence window that spans a single audio frame and AER2 for a coexistence window that spans two consecutive audio frames of the first wireless communication protocol. Although it is contrary to intuition to have a coexistence window span two consecutive audio frames because it affects two audio frames instead of just one, the graphs show it results in a lower average AER.

If the coexistence window spans a single audio frame and is repeated every $9^{th}$ audio frame of the first wireless communication protocol that specific audio frame will only have one reception attempt: $AER=PER^1$. For the other 8 audio frames there will be the usual 3 reception attempts: $AER=PER^3$. The average AER across those 9 audio frames is: $AER1=(PER+8*PER^3)/9$.

In contrast to spanning a single audio frame, if the coexistence window spans two consecutive audio frames, it means that for those two audio frames there will be only 2 reception attempts: $AER=PER^2$. For the other 7 audio frames there will be the usual 3 reception attempts: $AER=PER^3$. The average AER across those 9 audio frames is: $AER2=(2*PER^2+7*PER^3)/9$.

From this calculation and as shown in the graph, it is evident that the impact on audio quality is reduced (e.g., minimized) if a coexistence window spans two consecutive audio frames. This is because it is better that 2 reception attempts are available in both Frame 0 and Frame 1 than having only 1 attempt in Frame 0 and 3 attempts in Frame 1.

FIG. 6 illustrates a schematic overview diagram of the first wireless communication protocol and the second wireless communication protocol after modification with a coexistence window repeated every $9^{th}$ audio frame of the first wireless communication protocol. Here, the periodic repetition of the coexistence window and time duration between coexistence windows can vary based on desired tradeoff between AER in the first wireless communication protocol 220 versus responsiveness of the second wireless communication protocol 225.

As shown in FIG. 6, the coexistence window is labeled a "coex window". The slots for the second wireless communication protocol 225 inside the coexistence window do not have a bold border, which indicates that these packets have a higher priority than packets for the first wireless communication protocol 220. Outside of the coexistence, the packets in the second wireless communication protocol 225 have a bold border, which indicates these packets have lower priority than the packets of the first wireless communication protocol 220. Also, as shown in FIG. 6, the diagonal lines in the packets of the first wireless communication protocol 220 indicate these packets are optional in that these are only transmitted if the packets need to be retransmitted (as discussed in FIGS. 3A and 3B).

The phrases "in some implementations," "according to some implementations," "in the implementations shown," "in other implementations," and generally mean a feature, structure, or characteristic following the phrase is included in at least one implementation of the disclosure, and may be included in more than one implementation. In addition, such phrases do not necessarily refer to the same implementations or different implementations.

The techniques introduced here can be embodied as special-purpose hardware (e.g., circuitry), as programmable circuitry appropriately programmed with software or firmware, or as a combination of special-purpose and programmable circuitry. Hence, implementations may include a machine-readable medium having stored thereon instructions which may be used to program a computer (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. In some implementations, the machine-readable medium is non-transitory computer readable medium, where in non-transitory excludes a propagating signal.

The above detailed description of examples of the disclosure is not intended to be exhaustive or to limit the disclosure to the precise form disclosed above. While specific examples for the disclosure are described above for illustrative purposes, various equivalent modifications are possible within the scope of the disclosure, as those skilled in the relevant art will recognize. For example, while processes or blocks are presented in an order, alternative implementations may perform routines having steps, or employ systems having blocks, in a different order, and some processes or blocks may be deleted, moved, added, subdivided, combined, or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc. As another example, "A or B" can be only A, only B, or A and B.

We claim:

1. A method for a wireless communication device to communicate using a shared transceiver, the method comprising:
    aligning a timing of audio frames of a first wireless communication protocol with a timing of slots of a second wireless communication protocol to reduce overlapping requests to access the shared transceiver from the first wireless communication protocol and the second wireless communication protocol;
    receiving a first request to access the shared transceiver of the wireless communication device from the first wireless communication protocol and receiving a second request to access the shared transceiver of the wireless communication device from the second wireless communication protocol during a coexistence window, the coexistence window having a duration of less than or equal to a duration of an audio frame of the first wireless communication protocol;
    granting the second request from the second wireless communication protocol to be executed based on priority of the second wireless communication protocol over the first wireless communication protocol during the coexistence window;
    receiving a third request to access the shared transceiver of the wireless communication device from the first wireless communication protocol and receiving a fourth request to access the shared transceiver of the wireless communication device from the second wireless communication protocol outside of the coexistence window; and
    granting the third request from the first wireless communication protocol to be executed based on priority of the first wireless communication protocol over the second wireless communication protocol outside the coexistence window.

2. The method of claim 1, wherein the coexistence window overlaps two consecutive audio frames of the first wireless communication protocol.

3. The method of claim 1, wherein the coexistence window is repeated every 9th audio frame of the first wireless communication protocol.

4. The method of claim 1, the method further comprising:
    determining that the wireless communication device is binaurally streaming audio information.

5. The method of claim 1, the method further comprising: transmitting the second request.

6. The method of claim 1, the method further comprising: transmitting the third request.

7. The method of claim 1, wherein the first wireless communication protocol is a synchronous low-latency audio streaming protocol, wherein low-latency includes end-to-end audio latency of less than 20 milliseconds.

8. The method of claim 1, wherein a maximum slot size of packets transmitted or received from the second wireless communication protocol are based on the duration of the coexistence window.

9. The method of claim 1, the first wireless communication protocol is a binaural or bimodal voice streaming protocol for hearing devices.

10. The method of claim 1, the second wireless communication protocol is Bluetooth Basic Rate/Enhanced Data Rate™.

11. The method of claim 1, wherein the first request and the second request are received simultaneously.

12. The method of claim 1, wherein the third request and the fourth request are received simultaneously.

13. The method of claim 1, the method further comprising:
    determining that first wireless communication protocol has been deactivated; and
    discontinuing the time aligning of the first and second wireless communication protocols.

14. The method of claim 1, wherein a time duration between two consecutive coexistence windows is less than or equal to 22.5 milliseconds and greater than or equal to 5 milliseconds.

15. The method of claim 1, wherein the coexistence window is repeated periodically.

16. The method of claim 1, wherein the coexistence window overlaps with sniff anchor points of the second wireless communication protocol when the second wireless communication protocol operates in sniff mode.

17. The method of claim 1, wherein the coexistence window is included in the first wireless communication protocol, included in the second wireless communication protocol, or computed by a controller of the wireless communication device.

18. The method of claim 1, the method further comprises:
preventing the second wireless communication protocol from transmitting packets even if the first wireless communication protocol does not require access to the shared transceiver outside of the coexistence window.

19. The method of claim 1, the method further comprises:
preventing an exchange of multiple slot packets on the second wireless communication protocol.

20. The method of claim 1, wherein the slots are associated with master-slave communications for a hearing device, wherein the hearing device is a master device or a slave device.

21. A wireless communication device, the wireless communication device comprising:
a memory storing a first wireless communication protocol and a second wireless communication protocol,
the first wireless communication protocol for streaming audio, and
the second wireless communication protocol configured to transmit or receive packets in slots;
a controller, electronically coupled to the memory, for controlling transmission and reception of packets based on requests from the first wireless communication protocol and the second wireless communication protocol; and
a shared transceiver, electronically coupled to the controller, for transmitting or receiving the packets,
wherein
the controller is configured to:
align a timing of audio frames of a first wireless communication protocol with a timing of slots of a second wireless communication protocol to reduce overlapping requests to access the shared transceiver from the first wireless communication protocol and the second wireless communication protocol;
receive a first request to access the shared transceiver of the wireless communication device from the first wireless communication protocol and receiving a second request to access the shared transceiver of the wireless communication device from the second wireless communication protocol during a coexistence window, the coexistence window having a duration of less than or equal to a duration of an audio frame of the first wireless communication protocol;
grant the second request from the second wireless communication protocol to be executed based on priority of the second wireless communication protocol over the first wireless communication protocol during the coexistence window;
receive a third request to access the shared transceiver of the wireless communication device from the first wireless communication protocol and receiving a fourth request to access the shared transceiver of the wireless communication device from the second wireless communication protocol outside of the coexistence window; and
grant the third request from the first wireless communication protocol to be executed based on priority of the first wireless communication protocol over the second wireless communication protocol outside the coexistence window.

22. The wireless communication device of claim 21, wherein the first wireless communication protocol is a synchronous low-latency audio streaming protocol, wherein low-latency includes end-to-end audio latency of less than 20 milliseconds.

23. The wireless communication device of claim 21, wherein the memory further comprises instructions for performing phone call streaming for the wireless communication device.

24. A non-transitory computer-readable medium storing instructions, which when executed by a processor cause a hearing device or wireless device to perform operations, the operations comprising:
aligning a timing of audio frames of a first wireless communication protocol with a timing of slots of a second wireless communication protocol to reduce overlapping requests to access a shared transceiver from the first wireless communication protocol and the second wireless communication protocol;
receiving a first request to access the shared transceiver of the wireless communication device from the first wireless communication protocol and receiving a second request to access the shared transceiver of the wireless communication device from the second wireless communication protocol during a coexistence window, the coexistence window having a duration of less than or equal to a duration of an audio frame of the first wireless communication protocol;
granting the second request from the second wireless communication protocol to be executed based on priority of the second wireless communication protocol over the first wireless communication protocol during the coexistence window;
receiving a third request to access the shared transceiver of the wireless communication device from the first wireless communication protocol and receiving a fourth request to access the shared transceiver of the wireless communication device from the second wireless communication protocol outside of the coexistence window; and
granting the third request from the first wireless communication protocol to be executed based on priority of the first wireless communication protocol over the second wireless communication protocol outside the coexistence window.

* * * * *